(12) United States Patent
Yamauchi et al.

(10) Patent No.: US 7,034,832 B2
(45) Date of Patent: Apr. 25, 2006

(54) COMPUTER READABLE MEDIUM STORING 3-D IMAGE PROCESSING PROGRAM, 3-D IMAGE PROCESSING METHOD AND DEVICE, 3-D IMAGE PROCESSING PROGRAM, AND VIDEO GAME DEVICE

(75) Inventors: Madoka Yamauchi, Osaka (JP); Hirotaka Hosokawa, Osaka (JP); Junji Maruhashi, Osaka (JP); Jyutarou Ohue, Oshaka (JP)

(73) Assignee: Konami Corporation, Tokyo (JP)

( * ) Notice: Subject to any disclaimer, the term of this patent is extended or adjusted under 35 U.S.C. 154(b) by 32 days.

(21) Appl. No.: 10/114,705

(22) Filed: Apr. 1, 2002

(65) Prior Publication Data

US 2002/0145604 A1 Oct. 10, 2002

(30) Foreign Application Priority Data

Apr. 5, 2001 (JP) ............................. 2001-106991

(51) Int. Cl.
*G06T 15/70* (2006.01)
(52) U.S. Cl. ....................... 345/473; 345/646; 345/647
(58) Field of Classification Search ................ 345/420, 345/647, 419, 646, 473; 382/215
See application file for complete search history.

(56) References Cited

U.S. PATENT DOCUMENTS

| | | | |
|---|---|---|---|
| 4,790,028 A | | 12/1988 | Ramage |
| 5,533,183 A | * | 7/1996 | Henderson et al. ......... 715/854 |
| 5,798,752 A | * | 8/1998 | Buxton et al. .............. 715/863 |
| 5,892,691 A | * | 4/1999 | Fowler .......................... 703/6 |
| 5,903,458 A | * | 5/1999 | Stewart et al. ................ 700/98 |
| 5,966,132 A | | 10/1999 | Kakizawa et al. |
| 5,995,110 A | * | 11/1999 | Litwinowicz ............... 715/848 |
| 6,072,496 A | * | 6/2000 | Guenter et al. ............. 345/419 |
| 6,236,402 B1 | * | 5/2001 | Edmark ...................... 345/419 |

(Continued)

FOREIGN PATENT DOCUMENTS

EP 0651350 5/1995

(Continued)

OTHER PUBLICATIONS

Article by Manojit Sarkar and Marc H. Brown "Graphical Fisheye views of graphs", pp. 83-91, 1992 ACM 0-89791-513-5/92/0005-0083.*

(Continued)

*Primary Examiner*—Ulka Chauhan
*Assistant Examiner*—Enrique L. Santiago
(74) *Attorney, Agent, or Firm*—Jordan and Hamburg LLP

(57) ABSTRACT

In order to generate, on a display screen, a natural-looking deformed image obtained by intentionally distorting an original image, a buffer 21 comprises an original image storage section 210 which stores an original image, and a model storage section 211 which stores a 3-D model, comprising a plurality of polygons, and having a shape in which at least a portion of a plane is distorted in 3-D space. A drawing processor 10 comprises an image pasting section 100, which reads an original image from the original image storage section 210, reads a 3-D model from the model storage section 211, and pastes the above original image, as a texture, onto the above 3-D model, and a deformed image drawing section 101, which, by writing to a frame buffer 213, draws on a monitor 22 a deformed image, which is an image of the above 3-D model onto which an original image has been pasted, as seen from a prescribed camera viewpoint.

11 Claims, 9 Drawing Sheets

U.S. PATENT DOCUMENTS

| | | | |
|---|---|---|---|
| 6,525,731 B1 * | 2/2003 | Suits et al. | 345/427 |
| 6,608,622 B1 * | 8/2003 | Katayama et al. | 345/419 |
| 6,608,631 B1 * | 8/2003 | Milliron | 345/647 |

FOREIGN PATENT DOCUMENTS

| | | |
|---|---|---|
| EP | 0676724 | 10/1995 |
| EP | 0989524 | 3/2000 |
| JP | 6-296754 | 10/1994 |
| JP | 2000-76481 | 3/2000 |
| JP | 2001-224847 | 8/2001 |

OTHER PUBLICATIONS

Article "Generalized Fisheye Views" by George W. Furnas, CHI'86 Proceedings, pp. 16-23, Apr. 1986, ACM 0-89791-180-6/86/0400-0016.*

Persistence of Vision(tm) Ray-Tracer (POV-Ray(tm)) User's Documentation 3.0 Copyright 1997 POV-Team(tm) http://www.etsimo.uniovi.es/povray/.*

XP-001051168—A Framework for Elastic Presentation Space By: Marianne Sheelagh Therese Carpendale B.Sc. Simon Fraser University 1992.

* cited by examiner

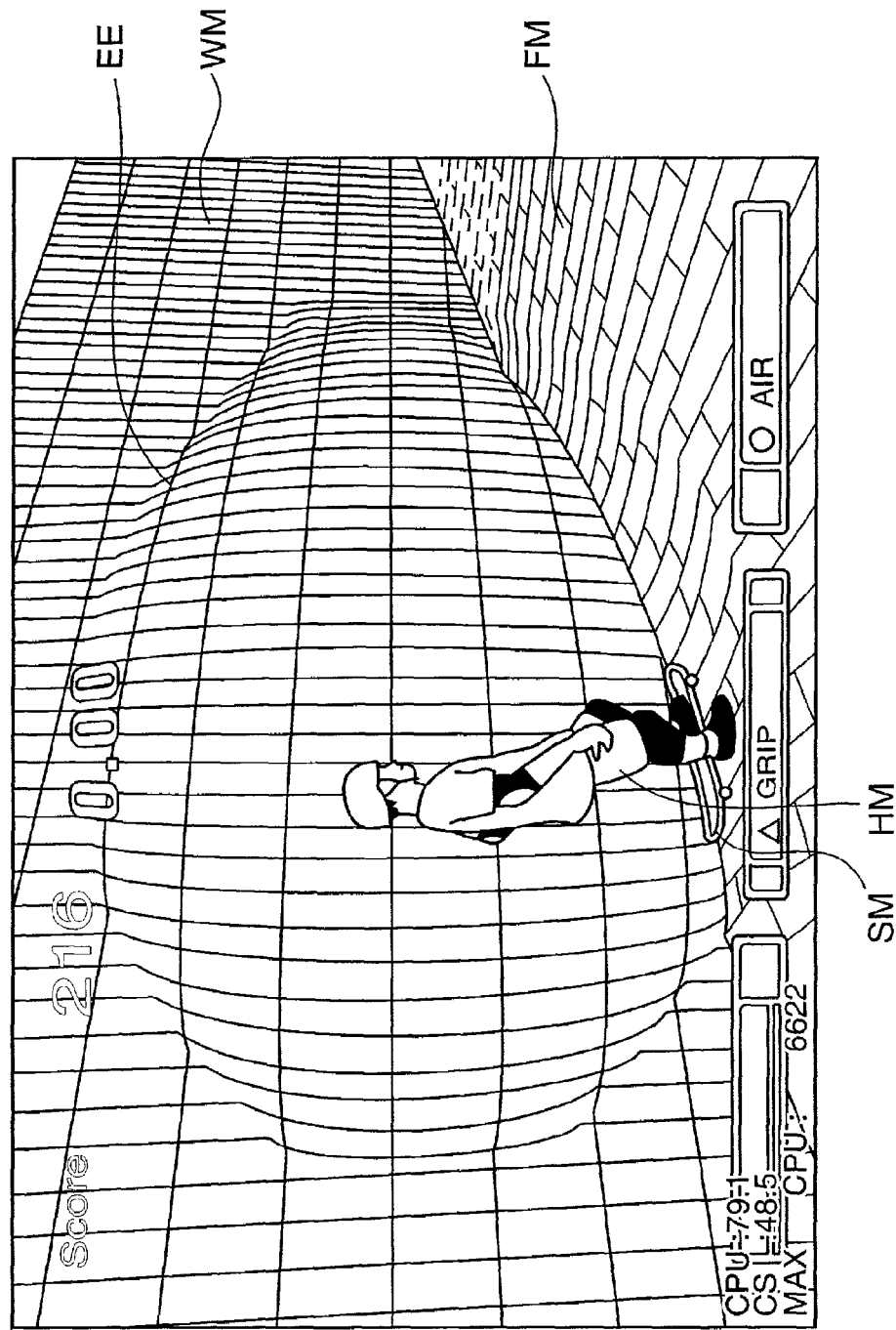

COMPUTER READABLE MEDIUM STORING 3-D IMAGE PROCESSING PROGRAM, 3-D IMAGE PROCESSING METHOD AND DEVICE, 3-D IMAGE PROCESSING PROGRAM, AND VIDEO GAME DEVICE

BACKGROUND OF THE INVENTION

1. Field of the Invention

This invention relates to 3-D (dimensional) image processing technology for performing prescribed image processing to generate, on a display screen, a deformed image obtained by intentional distortion of an original image, for use in for example video game equipment or similar.

2. Description of the Related Art

In recent years, numerous game devices have appeared which display characters (humans or similar) in a quasi-3-D space on a monitor screen. Among such game devices, there are games that mimic skiing, surfing, motorboating, snowboarding, skateboarding, and car racing. In such a game device, when an image of a character moves in a quasi-3-D space, imparting a sense of speed further increases the sense of presence and heightens interest in the game.

On the other hand, in actual photography of skiing, surfing, motorboating, snowboarding, skateboarding, car racing or similar, in order to heighten the sense of presence, techniques are employed in which a fisheye lens is used to increase the sense of speed. Hence in game devices also, by displaying on the monitor screen of the game device an image which appears to have been photographed through a fisheye lens, the sense of speed can be increased and a heightened sense of presence obtained.

Conventionally, in processing to create an image that appears to have been photographed through a fisheye lens (which processing is hereafter called "fisheye processing"), the method described below has been used. First, as shown in FIG. 7A, an original image (a normal image, not appearing to have been taken through a fisheye lens) is divided into small images of a prescribed size. Then, as shown in FIG. 7B, an elliptical region EP (called the "fisheye region") with center at the image center is described, and each of the small image regions is deformed such that the image in this region appears to have been photographed through a fisheye lens. Then, each of the small images in FIG. 7A is textured, deformed into the corresponding region in FIG. 7B, and pasted into the region.

FIG. 9 is an image obtained by performing fisheye processing, using the method described above, on the original image shown in FIG. 8. As shown in FIG. 9, in the vicinity of the outer border of the fisheye region, straight lines in the original image are deformed into broken-line shapes to form an unnatural image, whereas in the case of actual photography through a fisheye lens, straight lines in the original image are deformed into smooth curves.

The present invention was devised in light of the above problem, and has as an object the provision of a 3-D image processing method and device, a 3-D image processing program, and a video game device which generate, on a display screen, a natural-looking deformed image obtained by intentionally distorting an original image.

SUMMARY OF THE INVENTION

In order to achieve the object of the present invention, a computer readable recording medium storing a 3-D image processing program, which intentionally distorts an original image to generate a deformed image on a display screen. The 3-D image processing program comprising the steps of: storing an original image and a 3-D model comprising a plurality of polygons and having a shape in which at least a portion of a plane is distorted in 3-D space; performing image pasting processing, in which the original image is read and is pasted, as a texture, onto said 3-D model; and performing deformed image drawing processing, in which a deformed image, which is an image of said 3-D model onto which the original image has been pasted, as seen from a prescribed camera viewpoint, is drawn on a display screen.

In the above-described invention, an original image and a 3-D polygon model, comprising a plurality of polygons and having a shape in which at least a portion of a plane is distorted in 3-D space, are stored; the original image is read out and textured, and is pasted onto the polygon model, and an image of the polygon model onto which the original image is pasted, and which is seen from a prescribed camera viewpoint, is drawn on a display screen, to obtain a natural-looking deformed image as a result of intentional distortion of the original image.

Note that throughout this specification the terms "3-dimensional" and "2-dimensional" are expressed as "3-D" and "2-D", respectively, for short.

These and other objects, features, and advantages of the present invention will become apparent upon reading the following detailed description along with the accompanied drawings.

BRIEF DESCRIPTION OF THE DRAWINGS

FIG. 6 is a drawing of an image for the case in which a deformed image is displayed on the entire screen;

DESCRIPTION OF THE PREFERRED EMBODIMENTS

Note that throughout this specification the terms "3-dimensional" and "2-dimensional" are expressed as "3-D" and "2-D", respectively, for short.

Figure 1:
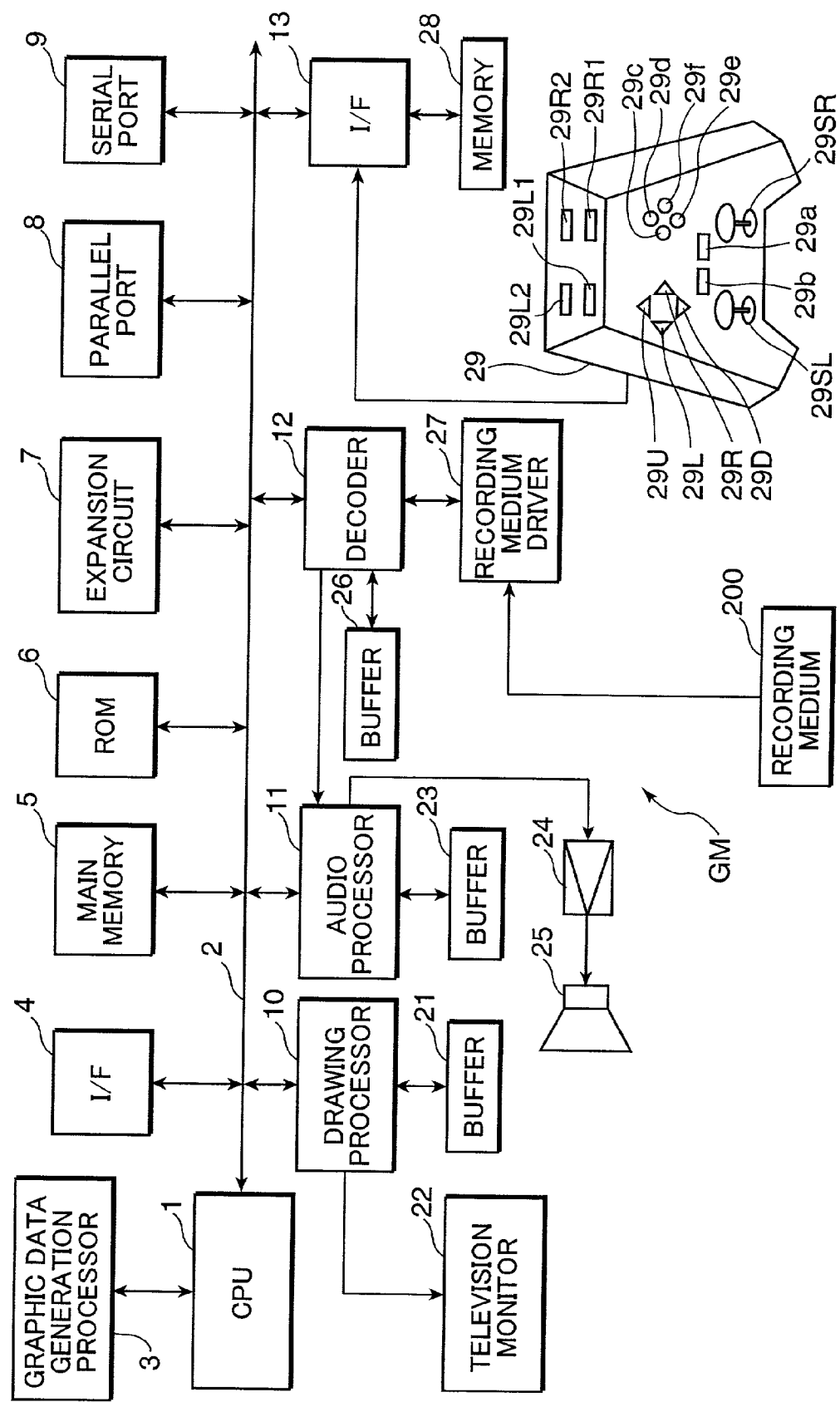
FIG. 1 is a block diagram showing one aspect of a video game device of this invention.

FIG. 1 is a block diagram showing one aspect of a video game device of this invention. This video game device comprises a game main unit GM and recording medium 200 on which is recorded program data. The game main unit GM comprises a CPU (central processing unit) 1; a bus line 2 connected to the CPU 1 and having an address bus, data bus, and control bus; and a graphic data generation processor 3.

The bus line 2 is connected to an interface 4; RAM (random access memory) or other main memory 5; ROM (read-only memory) 6; an expansion circuit 7; a parallel port 8; a serial port 9; a drawing processor 10; an audio processor 11; a decoder 12; and an interface circuit 13. The drawing processor 10 is connected to a buffer 21, and also to a television monitor (hereafter "monitor") 22; the audio processor 11 is connected to a buffer 23, and to a speaker 25 via an amplifier circuit 24. The decoder 12 is connected to a buffer 26, and also to a recording medium driver 27; the interface circuit 13 is connected to memory 28, and also to a controller 29.

The form of this video game device changes according to the application. For example, when the video game device is configured for home use, the monitor 22 and speaker 25 are separate from the game main unit GM. On the other hand, when the video game device is configured for commercial use, all the component elements shown in FIG. 1 are housed in a single housing. When this video game device is configured with a personal computer or workstation as the core, the monitor 22 corresponds to the computer display; the drawing processor 10, audio processor 11, and expansion circuit 7 correspond to a portion of the program data recorded on the recording medium 200 or to hardware on an expansion board mounted in an expansion slot of the computer; and the interface circuit 4, parallel port 8, serial port 9, and interface circuit 13 correspond to hardware on an expansion board mounted on an expansion slot of the computer. The buffers 21, 23, 26 correspond to areas in main memory 5 or in expansion memory (not shown). In this aspect, an example is explained for the case in which the video game device is configured for home use.

Next, each of the component elements shown in FIG. 1 is explained. The graphic data generation processor 3 plays a role similar to that of a coprocessor of the CPU 1. That is, the graphic data generation processor 3 employs parallel processing to execute coordinate conversions, light source calculations, and, for example, matrix and vector operations in fixed-decimal point format. The main processing tasks performed by this graphic data generation processor 3 is to determine addresses in the display area of the image being processed based on coordinate data for each vertex in image data supplied by the CPU 1 in 2- or 3-D space, movement amount data, and rotation amount data, and to return this data to the CPU 1, as well as to calculate image brightness according to distances from a virtually set light source.

The interface circuit 4 is an interface for use with a peripheral device, such as a mouse, trackball, or other pointing device. The ROM 6 stores program data as the operating system for the video game device. In terms of personal computers, this corresponds to the BIOS (basic input/output system).

The expansion circuit 7 performs processing to expand compressed images which have been compressed by intraframe coding conforming to the MPEG (Moving Picture Engineering Group) standard for video and the JPEG (Joint Picture Engineering Group) standard for still images. Expansion processing is decoding processing (decoding of data encoded using a VLC, or variable-length code), inverse quantization processing, IDCT (inverse discrete cosine transform) processing, processing to restore intra-frame-coded images, and similar. The drawing processor 10 performs drawing processing for the buffer 21 at each prescribed time T (one frame, for example, T=1/60 second), based on drawing instructions from the CPU 1.

The buffer 21 is RAM or similar, and comprises a display area (frame buffer) and non-display area. The display area is an area for expansion of data to be displayed on the display screen of the monitor 22. In this aspect, the non-display area comprises areas for storage of texture data and color palette data, in addition to data defining a skeleton, model data defining polygons, animation data to cause models to move, and pattern data representing the details of animation.

Here, texture data is 2-D image data. Color palette data is data to specify the colors of texture data and other data. These data types are recorded in the non-display area of the buffer 21 in advance by the CPU 1 from the recording medium 200, either all at once, or divided into a plurality of events according to the game progress. Drawing instructions include instructions to draw quasi-3-D images using polygons, and instructions to draw normal 2-D images. Here polygons are virtual 2-D polygonal shapes; in this aspect, quadrilaterals are used. Drawing instructions to draw 3-D images using polygons are executed for polygon vertex address data in the display area of the buffer 21; texture address data indicating storage positions in the buffer 21 of texture data to be pasted onto polygons; color palette address data indicating storage positions in the buffer 21 of color palette data, indicating colors for texture data; and brightness data indicating brightnesses for textures.

Of these data types, polygon vertex address data in the display area is obtained when the graphic data generation processor 3 substitutes polygon vertex coordinate data in 3-D space from the CPU 1 with polygon vertex coordinate data in 2-D, by performing a coordinate conversion based on movement amount data and rotation amount data for the screen itself. Brightness data is determined by the graphic data generation processor 3, based on distances from the positions from the CPU 1 indicated by polygon vertex coordinate data after the above coordinate conversion, to the virtually positioned light source. The above polygon vertex address data indicates the address in the display area of the buffer 21; the drawing processor 10 performs processing to write texture data corresponding to the range in the display area of the buffer 21 indicated by three polygon vertex addresses.

The characters and other objects within a virtual game space are configured from numerous polygons. The CPU 1 stores coordinate data in 3-D space for each polygon in the buffer 21, associated with skeleton vector data. When a character is moved on the display screen by operation of the controller 29, described below; that is, when the movement of the character itself is represented, or when the viewpoint from which a character is seen is changed, the following processing is performed.

The CPU 1 provides the graphic data generation processor 3 with 3-D coordinate data for the vertices of each polygon held within the non-display area of the buffer 21, as well as movement amount data and rotation amount data for each polygon, determined from the skeleton coordinates and rotation amount data. The graphic data generation processor 3 determines 3-D coordinate data for each polygon in succession after movement and rotation, based on the 3-D coordinate data for each polygon, and the movement amount data and rotation amount data for each polygon. Of the 3-D coordinate data for each polygon obtained in this way, coordinate data in the horizontal and vertical directions is supplied to the drawing processor 10 as address data in the display area of the buffer 21, that is, as polygon vertex address data. The drawing processor 10 writes texture data indicated by texture address data, allocated in advance, to a triangular display area in the buffer 21 indicated by three polygon vertex addresses. By this means, an object is displayed on the display screen of the monitor 22 by pasting texture data onto numerous polygons.

Drawing instructions to draw normal 2-D images are performed for vertex address data; texture address data;

color palette address data, indicating storage positions in the buffer 21 of color palette data indicating colors for texture data; and brightness data, indicating the brightness of textures. Of this data, the vertex address data is coordinate data obtained by the graphic data generation processor 3 by coordinate conversion of vertex coordinate data in a 2-D plane from the CPU 1, based on movement amount data and rotation amount data.

The audio processor 11 stores ADPCM (adaptive differential pulse code modulation) data read from the storage medium 200 in the buffer 23, and employs this ADPCM data stored in the buffer 23 as a sound source. The audio processor 11 reads the ADPCM data based on a clock signal at, for example, a frequency of 44.1 kHz. The audio processor 11 performs processing of the ADPCM data read from the buffer 23 to convert the pitch, add noise, set the envelope and level, add reverb, and similar.

When audio data read from the storage medium 200 is CD-DA (compact disc digital audio) or other PCM data, the data is converted into ADPCM data by the audio processor 11. Processing of PCM data by program data is performed directly in main memory 5. PCM data that has been processed in main memory 5 is supplied to the audio processor 11, and after conversion into ADPCM data, the various types of processing described above are performed, after which the result is output as an audio signal to the speaker 25.

The recording medium driver 27 is, for example, a CD-ROM drive, hard disk drive, optical disk drive, flexible disk drive, silicon disk drive, cassette medium reader, or similar. The recording medium 200 is, for example, a CD-ROM, hard disk, optical disk, flexible disk, semiconductor memory, or similar. The recording medium driver 27 reads image, audio, and program data from the recording medium 200, and supplies data which has been read to the decoder 12. The decoder 12 performs error correction processing using an ECC (error correction code) on the reproduced data from the recording medium driver 27, and supplies the error-corrected data to main memory 5 or to the audio processor 11. The memory 28 comprises, for example, holder or card-type memory. Card-type memory is used to hold various game parameters when the game is interrupted, as for example when saving the state of a game which is interrupted before ending.

The controller 29 is an operation means enabling operation from outside, and comprises a first left button 29L1, second left button 29L2, first right button 29R1, second right button 29R2, upward key 29U, downward key 29D, leftward key 29L, rightward key 29R, start button 29a, select button 29b, first button 29c, second button 29d, third button 29e, fourth button 29f, left joystick 29SL, and right joystick 29SR; operation signals are output to the CPU 1 according to operation by the player. The upward key 29U, downward key 29D, leftward key 29L, and rightward key 29R are used by the player to send commands to the CPU 1 causing, for example, a character or cursor to move upward, downward, leftward, or rightward on the screen of the monitor 22. The start button 29a is used by the player to instruct the CPU 1 to start game program data which has been loaded from the recording medium 200. The select button 29b is used by the player to instruct the CPU 1 regarding various selections with respect to game program data loaded into main memory 5 from the recording medium 200.

All of the buttons and keys of the controller 29, with the exceptions of the left joystick 29SL and right joystick 29SR, are on-off switches that are turned on upon being depressed from a neutral position by a depressing force from outside, and which are restored to the above neutral position when the depressing force is released. The left joystick 29SL and right joystick 29SR are stick-type controllers with essentially the same configurations as an ordinary joystick. That is, each has an upright stick, configured so as to be capable of tilting through 360°, including forward, backward, right and left, about a prescribed position of the stick as a fulcrum. With the upright position as the origin, values for the lateral-direction x-coordinate and anteroposterior-direction y-coordinate, corresponding to the direction of tilt and angle of tilt of the stick, are sent as operation signals to the CPU 1 via the interface circuit 13. The functions of the first left button 29L1, second left button 29L2, first right button 29R1, and second right button 29R2 differ depending on the game program data loaded from the recording medium 200.

Next, operation of this video game device is explained briefly. A power supply switch (not shown) is turned on to supply power to the video game device. At this time, when the recording medium 200 is loaded into the recording medium driver 27, according to the operating system stored in ROM 6, the CPU 1 instructs the recording medium driver 27 to read program data from the recording medium 200. By this means, the recording medium driver 27 reads image, audio, and program data from the recording medium 200. The image, audio, and program data thus read is supplied to the decoder 12, which performs error correction processing.

Image data which has been error-corrected by the decoder 12 is supplied to the expansion circuit 7 via the bus line 2; after the above-described expansion processing has been performed, the result is supplied to the drawing processor 10, and this drawing processor 10 writes the data to the non-display area of the buffer 21. Audio data which has been error-corrected by the decoder 12 is either written to main memory 5, or supplied to the audio processor 11 and written to the buffer 23. Program data which has been error-corrected by the decoder 12 is written to main memory 5. Subsequently, the CPU 1 advances the game based on game program data stored in main memory 5 and the details of instructions issued by the player via the controller 29. That is, the CPU 1 controls image processing, audio processing, and internal processing as appropriate, based on the details of instructions issued by the player via the controller 29.

In this aspect, image processing control is performed to, for example, calculate skeleton coordinates and polygon vertex coordinate data from pattern data related to animation which characters are instructed to exhibit; supply the obtained 3-D coordinate data and viewpoint position data to the graphic data generation processor 3; and issue drawing instructions for data including address data and brightness data in the non-display area of the buffer 21, determined by the graphic data generation processor 3. Audio processing control is performed to, for example, issue audio output commands to the audio processor 11, and to specify level, reverb, or other parameters. Internal control is performed to, for example, perform computations according to operation of the controller 29.

Image data which has been error-corrected by the decoder 12 is supplied to the expansion circuit 7 via the bus line 2, and after performing the expansion processing described above, is supplied to the drawing processor 10; the drawing processor 10 writes the data to the non-display area of the buffer 21. Audio data which has been error-corrected by the decoder 12 is either written to main memory 5, or is supplied to the audio processor 11 and written to the buffer 23. Program data which has been error-corrected by the decoder 12 is written to main memory 5. Subsequently, the CPU 1 advances the game based on game program data stored in main memory 5 and the details of instructions issued by the player via the controller 29. That is, the CPU 1 controls image processing, audio processing, and internal processing as appropriate, based on the details of instructions issued by the player via the controller 29.

Figure 2:
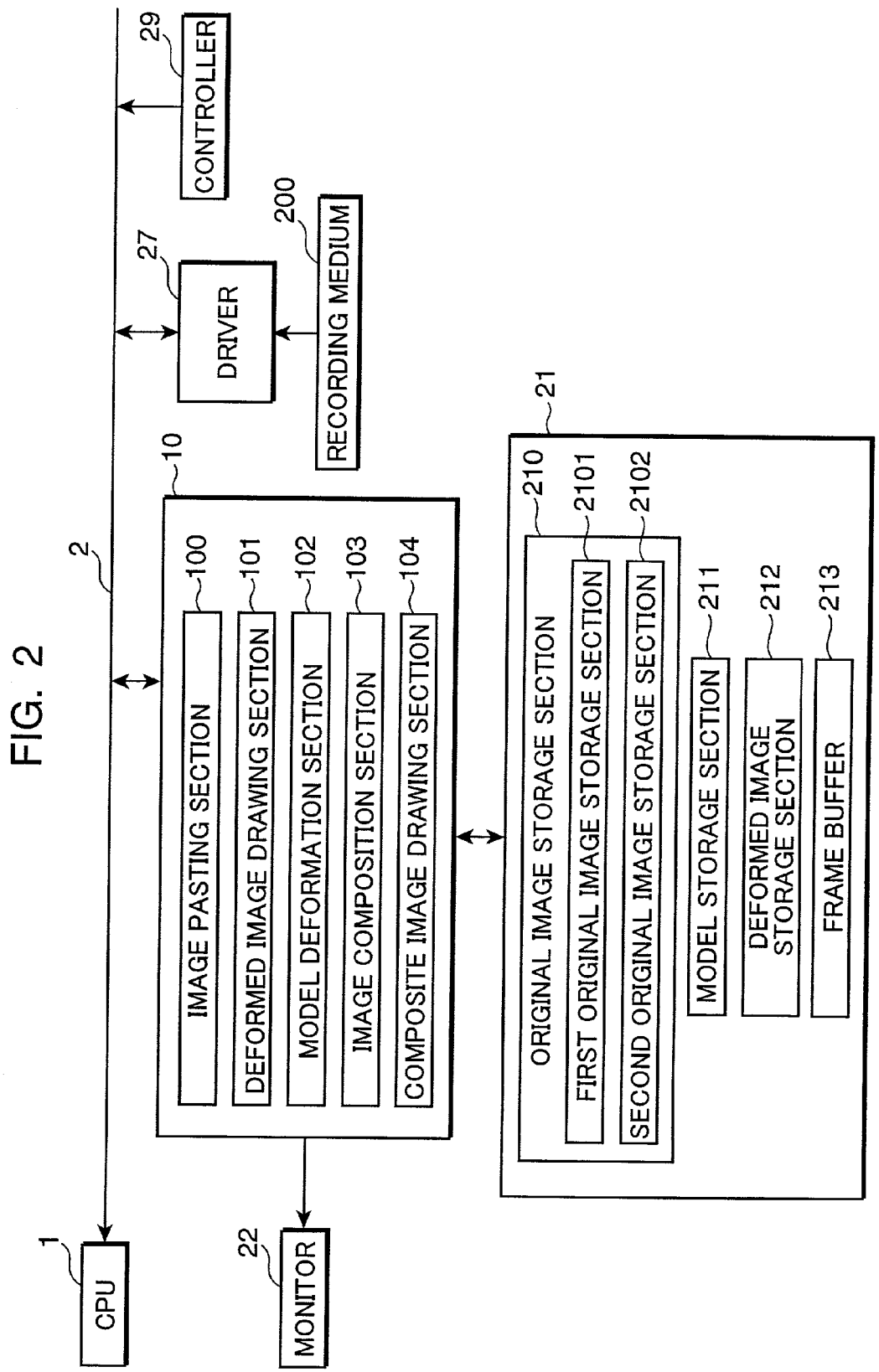
FIG. 2 is a block diagram showing the principal components of a 3-D image processing device of this invention.

FIG. 2 is a block diagram showing the principal components of a 3-D image processing device of this invention. The buffer 21 comprises an original image storage section 210 which stores original images; a model storage section 211 which stores a 3-D model, comprising a plurality of polygons, and having a shape obtained by distorting in 3-D space at least a portion of a plane; a deformed image storage section 212 which stores a deformed image, described below; and a frame buffer (display area) 213. The original image storage section 210, model storage section 211, and deformed image storage section 212 are comprised by the non-display area, previously described. The original image storage section 210 comprises a first original image storage section 2101 and a second original image storage section 2102, which respectively store a first original image and second original image, taken from different camera viewpoints.

The drawing processor 10 comprises an image pasting section 100, which reads the first original image from the first original image storage section 2101, reads the 3-D model from the model storage section 211, and pastes the above first original image, as a texture, onto the above 3-D model; a deformed image drawing section 101, which, by writing to the frame buffer 213, draws on the monitor 22 a deformed image which is the image of the above 3-D model onto which an original image is pasted, seen from a prescribed camera viewpoint, and stores the drawn deformed image in the deformed image storage section 212; a model deformation section 102, which reads the 3-D model from the model storage section 211, deforms the 3-D model, and stores the result in the model storage section 211; an image composition section 103, which reads a deformed image from the deformed image storage section 212, reads the second original image from the second original image storage section 2102, and combines the deformed image and second original image to create a composite image; and, a composite image drawing section 104, which, by writing to the frame buffer 213 a composite image created by the image composition section 103, draws the image on the monitor 22.

Figure 3:
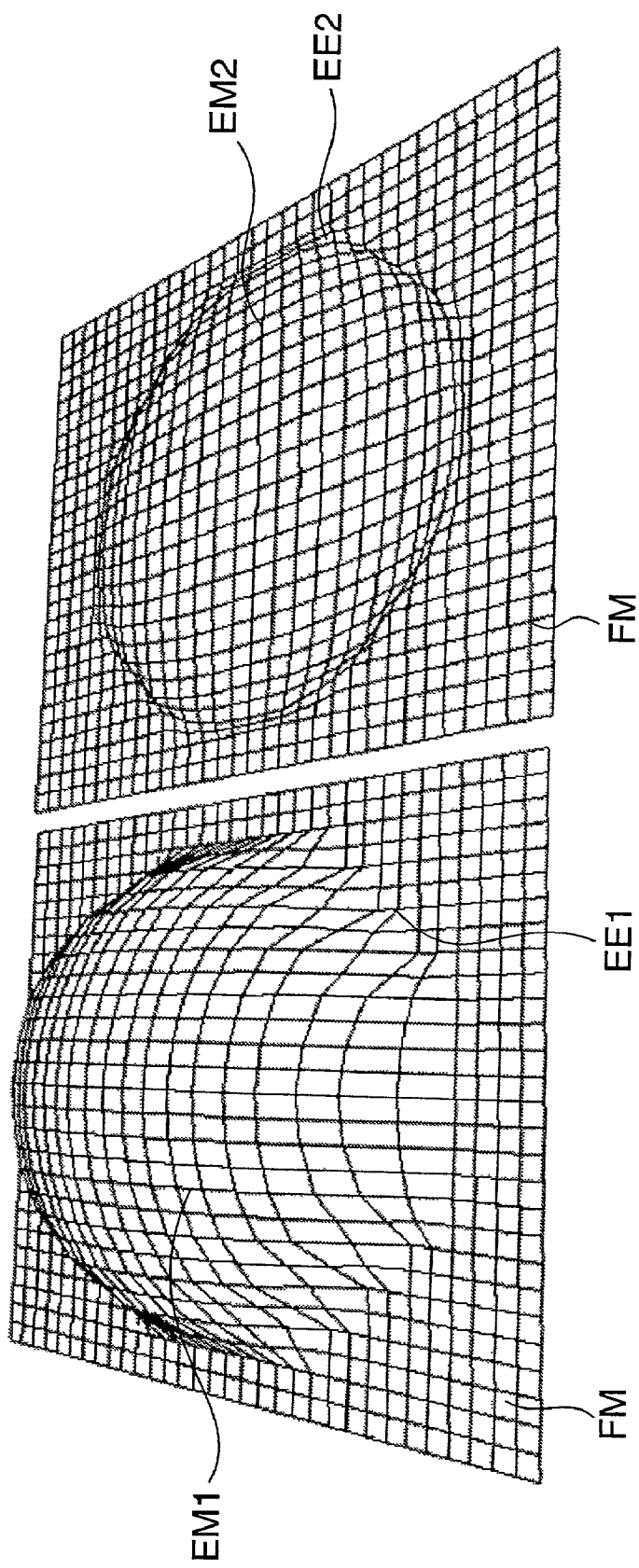
FIGS. 3A and 3B are examples of a 3-D model.

FIG. 3A and FIG. 3B show examples of a 3-D model stored in the model storage section 211. The 3-D model has the shape of a plane FM, having a rectangular outer perimeter, joined to a curved surface EM1 (EM2) formed by cutting a curved surface in the shape of an ellipsoid of revolution by the above plane FM. The boundary line EE1 (EE2) of the plane FM and curved surface EM1 (EM2) is an ellipse. FIG. 3A shows the case in which the curved surface EM1 is convex on the camera viewpoint side; FIG. 3B shows the case in which the curved surface EM2 is convex on the camera viewpoint side. The 3-D model is deformed by the model deformation section 102, by expansion and contraction of the curved surface of the above ellipsoid of revolution in the direction perpendicular to the plane FM. By deforming the 3-D model, the extent of distortion of the deformed image compared with the original image can be modified.

Figure 7A:
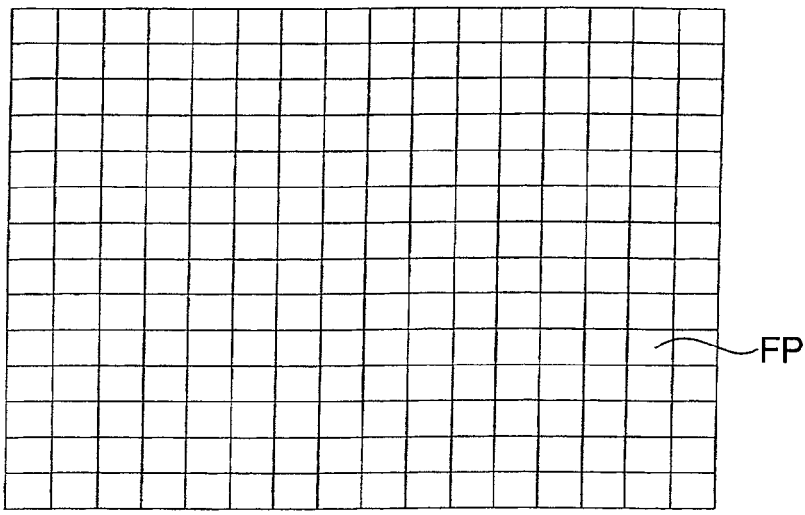
FIGS. 7A and 7B are diagrams to explain the conventional method for creating images which appear to have been photographed through a fisheye lens.
Figure 7B:
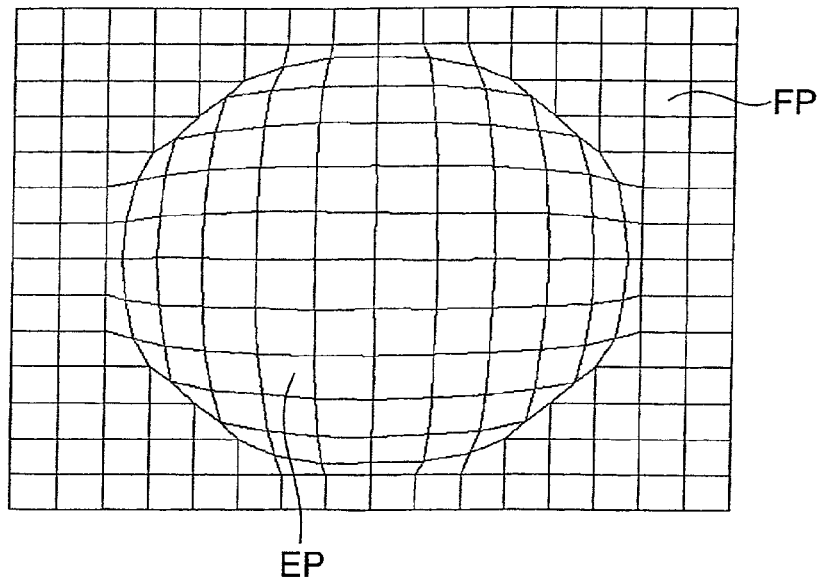

The image pasting section 100 reads the first original image from the first original image storage section 2101, and reads the 3-D model from the model storage section 211. The above first original image is divided into small images of a prescribed size, as shown in FIG. 7A, and deforms each small image as a texture and pastes it into the corresponding region of the 3-D model, as shown for example in FIG. 3A.

By writing to the frame buffer 213, the deformed image drawing section 101 draws on the monitor 22 the deformed image, which is an image of the 3-D model onto which the original image is pasted by the image pasting section 100, as seen from a prescribed camera viewpoint, and stores the drawn deformed image in the deformed image storage section 212. The above prescribed camera viewpoint is on a straight line, perpendicular to the plane FM comprised by the 3-D model shown in FIG. 3A, and which passes through the approximate center of the plane.

The image composition section 103 reads the deformed image from the deformed image storage section 212, reduces the image, reads the second original image from the second original image storage section 2102, and combines the reduced deformed image and the second original image into an image on one screen, to create a composite image.

Figure 4:
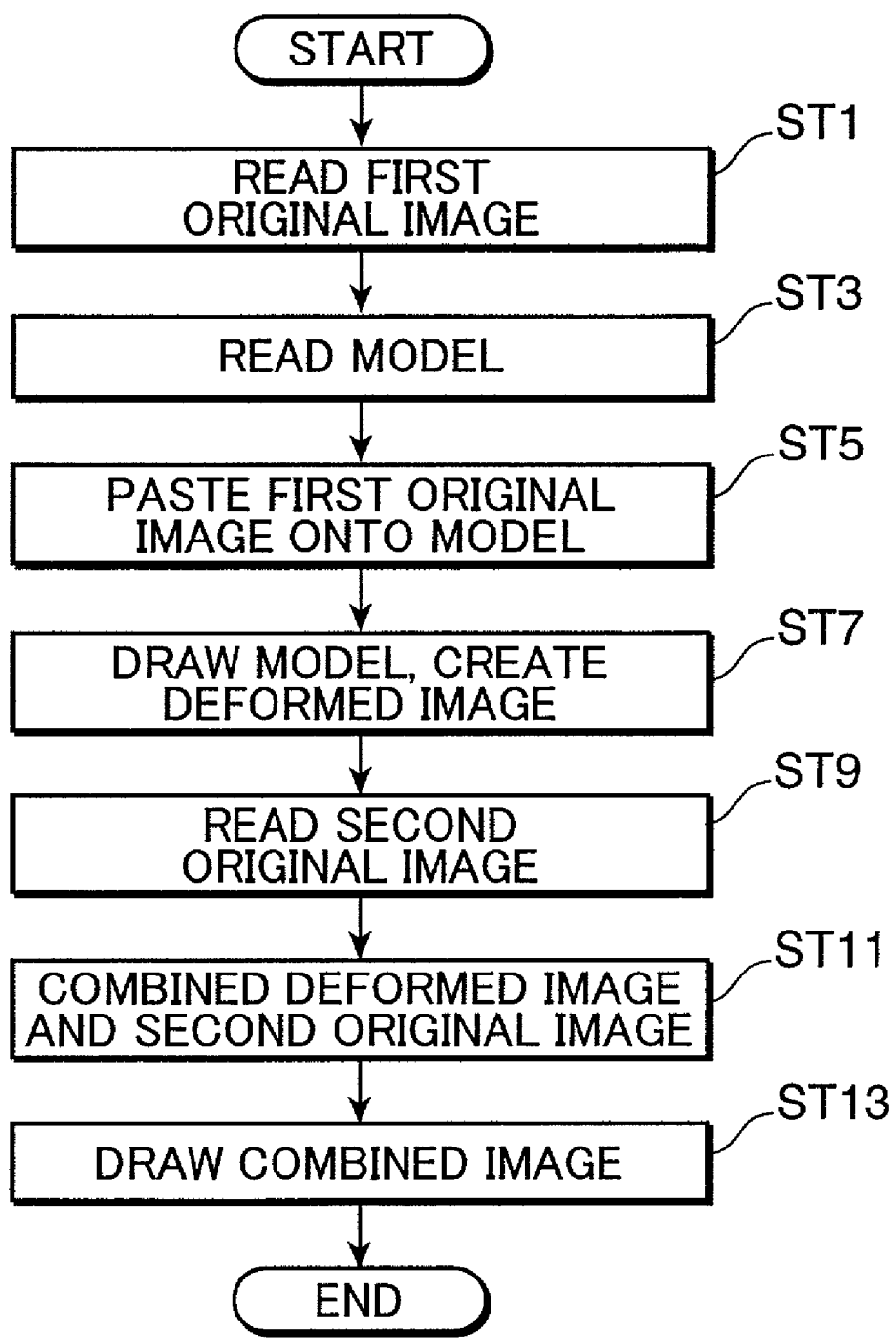
FIG. 4 is a flowchart showing in summary 3-D image processing of this invention.

FIG. 4 is a flowchart showing in summary 3-D image processing of this invention. Here the case in which the 3-D model is not deformed by the model deformation section 102 (or, the deformation is performed in advance) is explained. First, the image pasting section 100 performs the following processing. The first original image is read from the first original image storage section 2101 (ST1). Then, the 3-D model is read from the model storage section 211 (ST3). Then, the first original image is pasted, as a texture, onto the 3-D model (ST5).

Following this, by writing to the frame buffer 213, the deformed image drawing section 101 draws on the monitor 22 a deformed image, which is an image of the 3-D model, onto which the original image is pasted, as seen from a prescribed camera viewpoint, and then stores the drawn deformed image in the deformed image storage section 212 (ST7). Then the image composition section 103 reads the deformed image from the deformed image storage section 212, reads the second original image from the second original image storage section 2102 (ST9), and combines the deformed image and the second original image in an image on a single screen to create a composite image (ST11). Following this, the composite image drawing section 104 draws the composite image on the monitor 22 (ST13).

Figure 5:
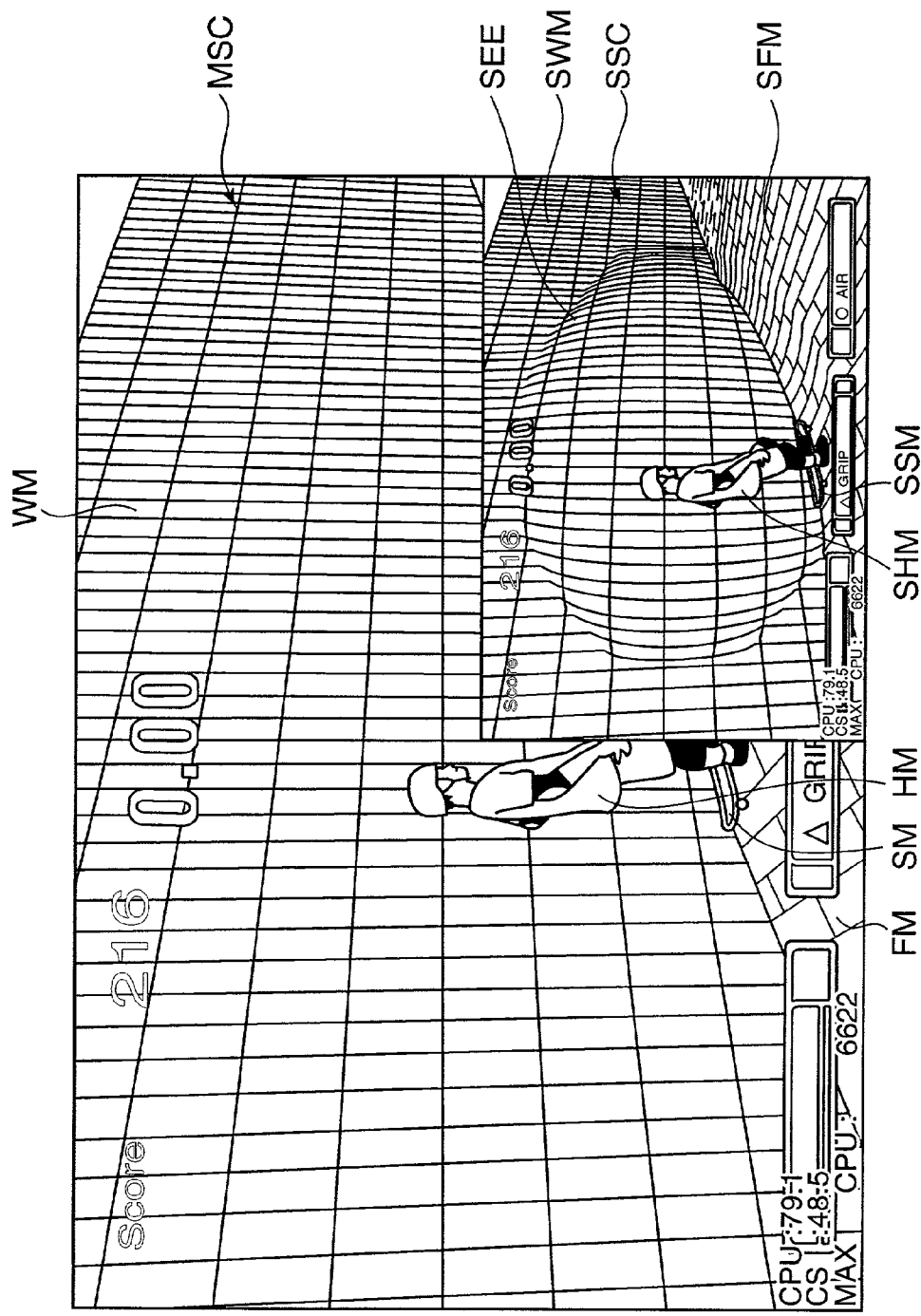
FIG. 5 is a drawing of an screen obtained by performing 3-D image processing of this invention.
Figure 8:
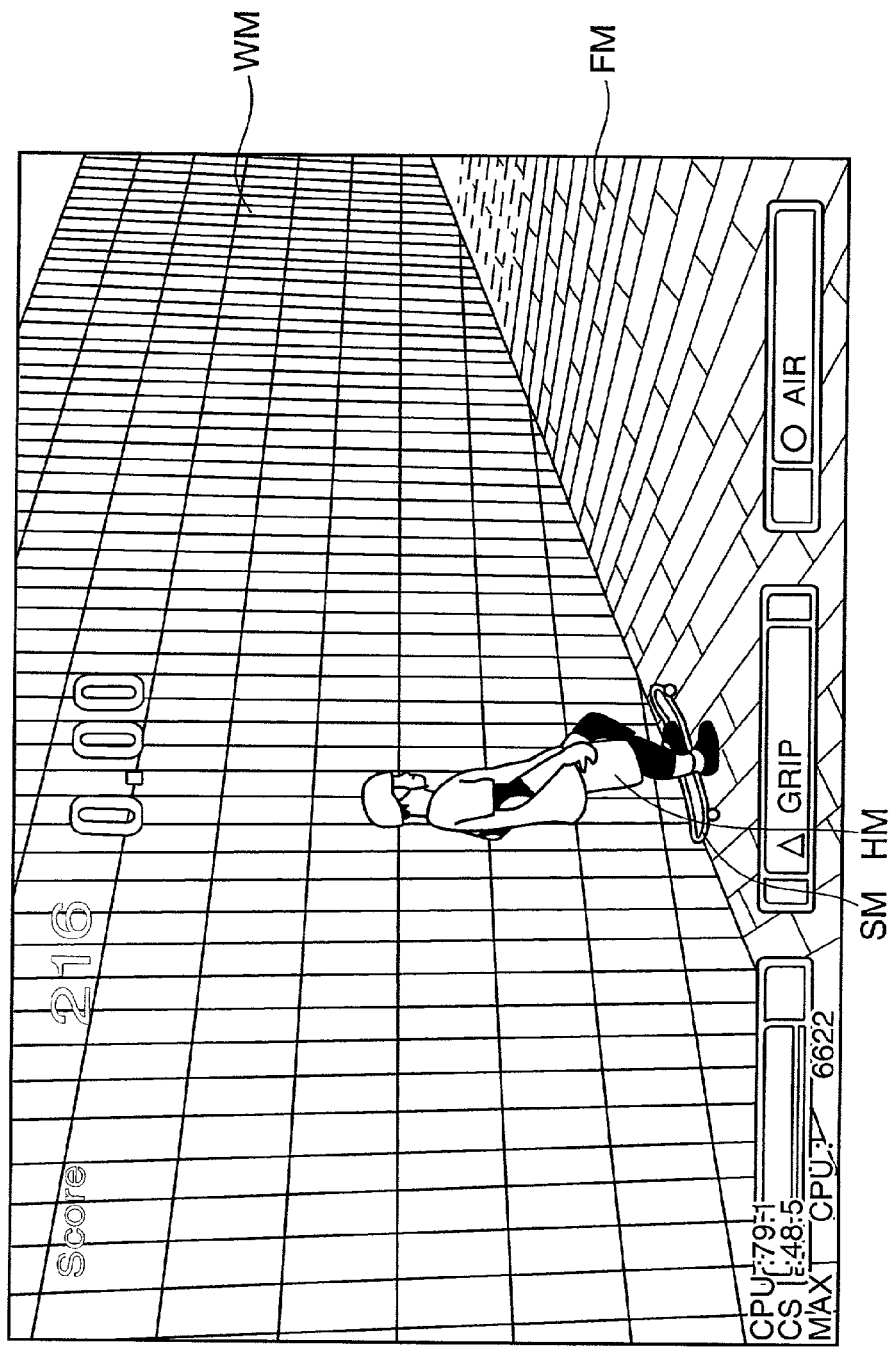
FIG. 8 is a drawing of a screen for the case in which the original image is displayed on the entire screen; and, FIG. 9 is a drawing of a screen for the case in which a deformed image obtained by the conventional method is displayed on the entire screen.

FIG. 5 is a drawing of an screen obtained by performing the 3-D image processing of this invention on the original image shown in FIG. 8. In this aspect, the first original image and second original image are the same image, shown in FIG. 8. In FIG. 8, a wall model WM with a lattice-shape pattern, a floor model FM with a brick pattern, and a human model HM, with one foot resting on a skateboard model SM, are drawn. The image shown in FIG. 5 comprises a large screen region MSC, displaying the second original image, and a small screen region SSC, displaying a deformed image obtained from the first original image. In this way, by displaying the original image in the large screen region MSC and a deformed image in the small screen region SSC, an image with a heightened sense of presence is obtained.

Figure 9:
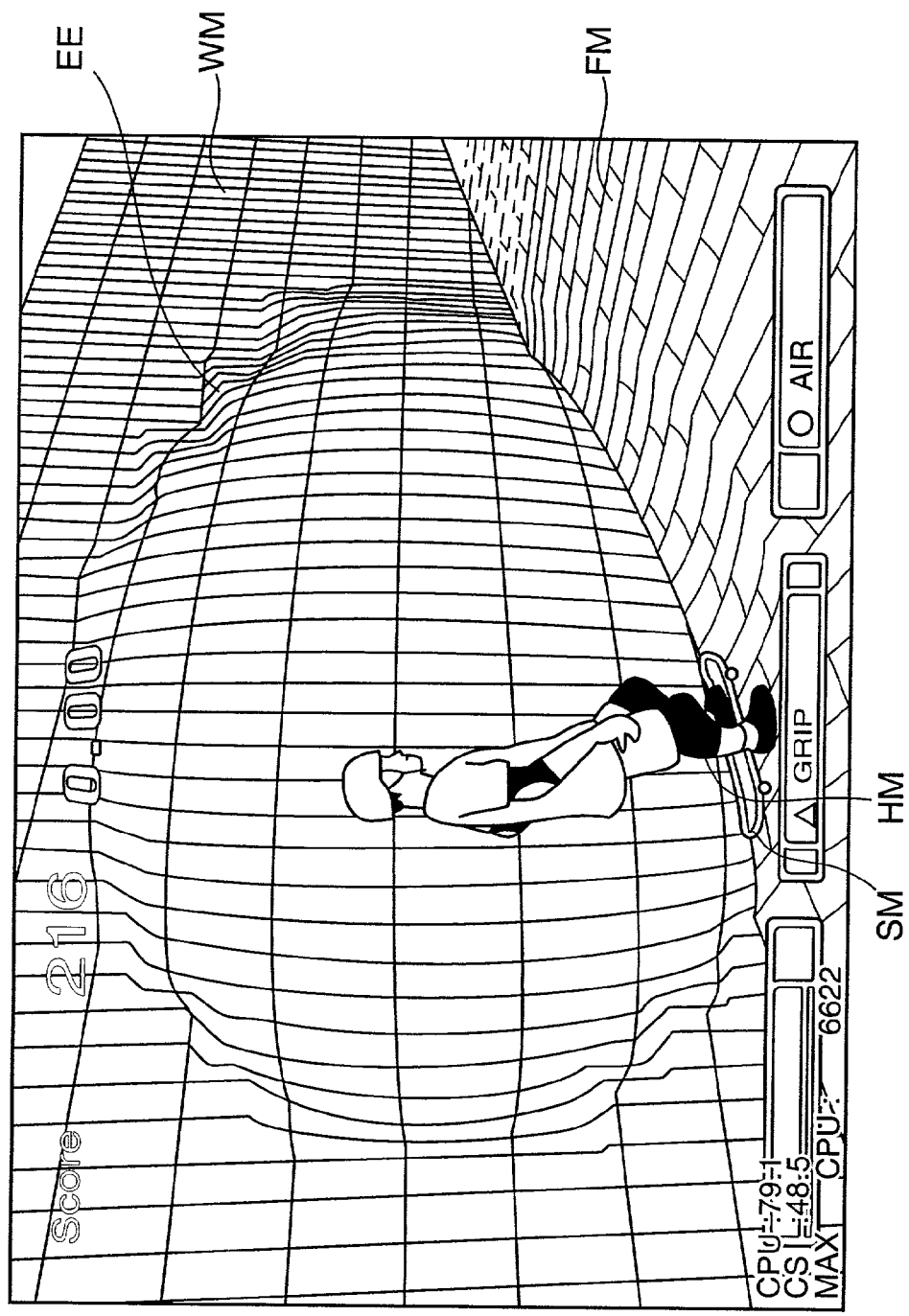

For the purpose of comparison with a screen display of a deformed image obtained by the conventional method and shown in FIG. 9, FIG. 6 shows a full-screen view of the deformed image of the first original image displayed in the small screen region SSC of FIG. 5, displayed on the entire screen. As explained above, in the deformed image of FIG. 9 obtained by the conventional method, in the vicinity of the outer border EE of the fisheye region, the image is unnaturally distorted, and straight lines in the original image are deformed into broken-line shapes to form an unnatural image. On the other hand, in the deformed image obtained by the method of this invention and shown in FIG. 6, even in the vicinity of the outer border EE of the fisheye region straight lines are deformed into curves, and a natural-looking image is obtained.

The present invention can take the following aspects.

(A) In this aspect of the invention, the case in which the first original image and second original image are the same image was explained; however, these may also be two original images taken from different camera viewpoints. In this case, it appears that images photographed from two different cameras are displayed, heightening the sense of presence.

(B) In this aspect of the invention, the case in which a deformed image is displayed in a small screen region, and an original image is displayed in a large screen region, was explained; however, the deformed image may be displayed in the large screen region, and the original image in the small screen region. Or, the former and the latter may be switched, according to the game progress. In the latter case, images rich in changes are drawn, heightening interest in the game.

(C) In this aspect of the invention, the case in which a 3-D model onto which an image has been pasted is not deformed (or, is deformed in advance) was explained; however, the 3-D model may be deformed according to the game progress. In this case, images rich in changes are drawn, heightening interest in the game.

(D) In this aspect of the invention, the case in which a composite image is drawn, formed by combining a deformed image and an original image into an image on a single screen, was explained; however, a deformed image alone may be drawn on a single screen. In this case, as it becomes possible to reduce the amount of memory required, processing becomes simpler.

(E) In this aspect of the invention, the case in which a 3-D model, onto which an image is pasted, has the shape of a plane having a rectangular outer perimeter and a curved surface formed by cutting the curved surface of an ellipsoid of revolution by the above plane, was explained; but any arbitrary shape in which at least a portion of a plane is distorted may be used. Because the deformed image is deformed according to the shape of the 3-D model, a shape may be selected from which a desired deformed image is obtained.

The 3-D image processing program of this invention is, for example, stored in advance in the recording medium 200, is transferred from the recording medium 200 to main memory 5, and processing is executed by the drawing processor 10 based on program data stored in main memory 5.

In summary, the present invention relates to a computer readable recording medium storing a 3-D image processing program, which intentionally distorts an original image to generate a deformed image on a display screen. The 3-D image processing program comprises the steps of: storing an original image and a 3-D model comprising a plurality of polygons and having a shape in which at least a portion of a plane is distorted in 3-D space; performing image pasting processing, in which the original image is read and is pasted, as a texture, onto said 3-D model; and performing deformed image drawing processing, in which a deformed image, which is an image of said 3-D model onto which the original image has been pasted, as seen from a prescribed camera viewpoint, is drawn on a display screen.

The present invention relates also to a 3-D image processing method, which intentionally distorts an original image to generate a deformed image on a display screen. The method comprises the steps of: storing an original image and a 3-D polygon model comprising a plurality of polygons and having a shape in which at least a portion of a plane is distorted in 3-D space; reading the original image and pasting the same, as a texture, onto said 3-D polygon model; and drawing a deformed image, which is an image of said 3-D polygon model onto which the original image has been pasted, as seen from a prescribed camera viewpoint, on a display screen.

The present invention also relates to a 3-D image processing device, which intentionally distorts an original image to generate a deformed image on a display screen, comprising: original image storage means for storing an original image; model storage means for storing a 3-D model comprising a plurality of polygons, having a shape in which at least a portion of a plane is distorted in 3-D space; image pasting means for reading an original image from said original image storage means and pasting the image, as a texture, onto said 3-D model; and deformed image drawing means for drawing on a display screen, a deformed image which is an image of said 3-D model, onto which the original image has been pasted, as seen from a prescribed camera viewpoint.

In the above-described invention, an original image and a 3-D polygon model, comprising a plurality of polygons and having a shape in which at least a portion of a plane is distorted in 3-D space, are stored; the original image is read out and textured, and is pasted onto the polygon model, and an image of the polygon model onto which the original image is pasted, and which is seen from a prescribed camera viewpoint, is drawn on a display screen, to obtain a natural-looking deformed image as a result of intentional distortion of the original image.

In the invention as described in the above, an original image, and a 3-D polygon model comprising a plurality of polygons and having a shape in which at least a portion of a plane is distorted in 3-D space are stored; the original image is read, and is pasted as a texture onto the polygon model; and an image of the polygon model onto which the original image has been pasted, as seen from a prescribed camera viewpoint, is drawn on a display screen, so that a natural-looking deformed image, in which the original image has been intentionally distorted, is obtained.

In the computer readable recording medium, wherein said 3-D model preferably has a shape in which a plane, having a rectangular outer perimeter, is joined with a curved surface obtained by cutting the curved surface of an ellipsoid of revolution by said plane. In the above invention, because the 3-D model has the shape of a plane having a rectangular outer perimeter joined to a curved surface which is an ellipsoid of revolution cut by the above plane, using deformed image drawing means, the portion of an image pasted onto the curved surface of the ellipsoid of revolution becomes a deformed image, deformed in the manner of an image photographed through a fisheye lens. In the invention as described, the 3-D model has a shape obtained by joining a plane having a rectangular outer perimeter, and a curved surface formed by cutting the curved surface of an ellipsoid of revolution by the above plane; consequently from the portion of the image pasted onto the curved surface of the ellipsoid of revolution is obtained, through deformed image drawing means, a deformed image, which is deformed in the manner of an image photographed through a fisheye lens.

In the computer readable recording medium, wherein model deformation processing is performed in which said 3-D model is deformed by expansion or contraction of the curved surface of said ellipsoid of revolution in the direction perpendicular to said plane. In the above invention, the curved surface of the ellipsoid of revolution is expanded and contracted in the direction perpendicular to the plane during model deformation processing, and the 3-D model is deformed, so that from the portion of the image pasted onto the curved surface of the ellipsoid of revolution, a deformed image with different extents of deformation, similar to the image deformation of an image which has been photographed through fisheye lenses with various extents of deformation, can easily be obtained. In the invention as described, in model deformation processing the curved surface of the ellipsoid of revolution is expanded and contracted in the direction perpendicular to the plane, deforming the 3-D model; hence from the portion of the image which is pasted onto the curved surface of the ellipsoid of revolution, a deformed image can easily be obtained with various extents of deformation, similar to images photographed through fisheye lenses with various extents of deformation.

In the computer readable recording medium, wherein said prescribed camera viewpoint is situated on a straight line perpendicular to the plane comprised by said 3-D model, and passing through the approximate center of the plane. In the above invention, because the camera viewpoint is on a line perpendicular to the plane and passing through the approximate center of the plane comprised by the 3-D model, a naturally deformed image is obtained, similar to an image photographed through a fisheye lens from a camera viewpoint on the axis of the fisheye lens. In the invention as described, the camera viewpoint 3 is situated on a straight line which is perpendicular to the plane and passes through the approximate center of the plane comprised by the three-D model, so that a natural-looking deformed image, similar to an image photographed through a fisheye lens from a camera viewpoint on the axis of the fisheye lens, can be obtained.

In the computer readable recording medium, wherein said 3-D image processing program further comprising the steps of storing said deformed image, drawn by said deformed image drawing processing; performing image composition processing in which an original image and the deformed image are read, and an image is composed on a single screen; and performing composite image drawing processing in which a composite image composed by said image composition processing is drawn on a display screen. In the above invention, because a composite image formed by composing the original image and a deformed image is drawn on the display screen, the sense of presence is heightened. In the invention as described, a composite image formed by combining an original image and a deformed image is drawn on a display screen, so that the sense of presence is heightened.

In the computer readable recording medium, wherein in the storing processing, a first original image and a second original image, which are two original images taken from different camera viewpoints, are stored; a deformed image of the first original image is stored; and, in said image composition processing, the second original image and the deformed image are combined. In the above invention, of the two original images taken from different camera viewpoints, a composite image, obtained by composition of a deformed image of one of the original images and the other original image, is drawn on the display screen, so that the drawn composite image appears to have been photographed by two cameras, and the sense of presence is further heightened. In the invention, of two original images taken from different camera viewpoints, a composite image is created by combining one of the original images and a deformed image of the other original image, and is drawn on a display screen; consequently the drawn composite image appears to have been photographed by two cameras, and the sense of presence is further heightened.

The present invention takes also a form of a video game device, which comprise: a 3-D image processing device, which intentionally distorts an original image to generate a deformed image on a display screen, including original image storage means for storing an original image, model storage means for storing a 3-D model comprising a plurality of polygons, having a shape in which at least a portion of a plane is distorted in 3-D space, image pasting means for reading an original image from said original image storage means and pasting the image, as a texture, onto said 3-D model, and deformed image drawing means for drawing on a display screen, a deformed image which is an image of said 3-D model, onto which the original image has been pasted, as seen from a prescribed camera viewpoint; image display means for displaying images; program storage means for storing game program data; and operation means, enabling operation from outside; wherein said 3-D image processing device displays images on the image display means according to said game program data. By means of the above invention, a video game device is realized in which, by means of the 3-D image processing device, a natural-looking deformed image is obtained as a result of intentional distortion of an original image, and the deformed image is displayed on the image display means according to game program data recorded by the program storage means. In the invention as described, a natural-looking deformed image in which an original image is intentionally distorted is obtained by means of a 3-D image processing device, and a video game device is realized in which a deformed image is displayed by image display means according to game program data recorded in program storage means.

This application is based on Japanese patent application serial no. 2001-106991, filed in Japan Patent Office on Apr. 5, 2001, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A computer readable recording medium storing an executable 3-D image processing program, which intentionally distorts an original image to generate a deformed image on a display screen, said 3-D image processing program comprising the steps of:

storing an original image;

storing a 3-D model comprising a plurality of polygons defining a shape including a plane in which a portion of said plane is distorted in 3-D space by a curved surface protruding therefrom, wherein the plane is bounded by a rectangular outer perimeter, and the curved surface is defined by said plane cutting through a volume defined by a rotation of an ellipsoid;

performing image pasting processing, in which the original image is read and is pasted, as a texture, onto said 3-D model to form a composite image; and performing deformed image drawing processing including:

deforming the composite image in accordance with viewing the 3-D model with the original image pasted thereon from a prescribed camera viewpoint; and drawing said deformed composite image on a display screen.

2. The computer readable recording medium according to claim 1, wherein model deformation processing is performed in which said 3-D model is deformed by expansion or contraction of the curved surface of said ellipsoid of revolution in the direction perpendicular to said plane.

3. The computer readable recording medium according to claim 1, wherein said prescribed camera viewpoint is situated on a straight line perpendicular to the plane comprised by said 3-D model, and passing through the approximate center of the plane.

4. The computer readable recording medium according to claim 1, wherein said 3-D image processing program further comprising the steps of:

storing said deformed image, drawn by said deformed image drawing processing;

performing image composition processing in which an original image and the deformed image are read, and an image including the original image in a major image area and said deformed image in a minor image area, smaller than said major image area, is composed on a single screen; and performing composite image drawing processing in which a composite image composed by said image composition processing is drawn on a display screen.

5. The computer readable recording medium according to claim 4, wherein:

in the storing processing, a first original image and a second original image, which are two original images taken from different camera viewpoints, are stored;

a deformed image of the first original image is stored; and, in said image composition processing, the second original image and the deformed image are combined.

6. A 3-D image processing method, which intentionally distorts an original image to generate a deformed image on a display screen, said method comprising the steps of:

storing an original image;

storing a 3-D polygon model comprising a plurality of polygons defining a shape including a plane in which a portion of plane is distorted in 3-D space by a curved surface protruding therefrom, wherein the plane is bounded by a rectangular outer perimeter, and the curved surface is defined by said plane cutting through a volume defined by a rotation of an ellipsoid;

reading the original image and pasting the same, as a texture, onto said 3-D polygon model to form a composite image;

deforming the composite image in accordance with viewing the 3-D model with the original image pasted thereon from a prescribed camera viewpoint; and drawing said deformed composite image on a display screen.

7. A 3-D image processing device, which intentionally distorts an original image to generate a deformed image on a display screen, comprising:

original image storage means for storing an original image;

model storage means for storing a 3-D model comprising a plurality of polygons defining a shape including a plane in which a portion of said plane is distorted in 3-D space by a curved surface protruding therefrom, wherein the plane is bounded by a rectangular outer perimeter, and the curved surface is defined by said plane cutting through a volume defined by a rotation of an ellipsoid;

image pasting means for reading an original image from said original image storage means and pasting the image, as a texture, onto said 3-D model to form a composite image;

deforming means for deforming the composite image in accordance with viewing the 3-D model with the original image pasted thereon from a prescribed camera viewpoint; and drawing means for drawing said deformed composite image on a display screen.

8. A video game device, comprising:

a 3-D image processing device, which intentionally distorts an original image to generate a deformed image on a display screen, including:

original image storage means for storing an original image;

model storage means for storing a 3-D model comprising a plurality of polygons defining a shape including a plane in which a portion of said plane is distorted in 3-D space by a curved surface protruding therefrom, wherein the plane is bounded by a rectangular outer perimeter, and the curved surface is defined by said plane cutting through a volume defined by a rotation of an ellipsoid;

image pasting means for reading an original image from said original image storage means and pasting the image, as a texture, onto said 3-D model to form a composite image;

deforming means for deforming the composite image in accordance with viewing the 3-D model with the original image pasted thereon from a prescribed camera viewpoint;

image display means for displaying images;

drawing means for drawing said deformed composite image on said image display means;

program storage means for storing game program data; and, operation means, enabling operation from outside;

wherein said 3-D image processing device displays images on the image display means according to said game program data.

9. A computer readable recording medium storing an executable 3-D image processing program, which intentionally distorts an original image to generate a deformed image on a display screen, said program comprising the steps of:

storing an original image;

storing a 3-D model comprising a plurally of polygons defining a shape including a plane in which a portion of said plane is distorted in 3-D space by a curved surface protruding therefrom, wherein the plane is bounded by a rectangular outer perimeter, and the curved surface is defined by said plane cutting through a volume defined by a rotation of an ellipsoid;

performing image pasting processing, in which the original image is read and is pasted, as a texture, onto said 3-D model to form a composite image; and, performing deformed image drawing processing including:

deforming the composite image in accordance with viewing the 3-D model with the original image pasted thereon from a prescribed camera viewpoint; and drawing said deformed composite image on a display screen.

10. A computer readable recording medium storing a 3-D image processing program, which intentionally distorts an original image to generate a deformed image on a display screen, said 3-D image processing program comprising the steps of:

storing an original image;

storing a 3-D model comprising a plurality of polygons defining a shape including a plane in which a portion of said plane is distorted in 3-D space by a curved surface protruding therefrom, wherein the plane is bounded by a rectangular outer perimeter, and the curved surface is defined by said plane cutting through a volume defined by a rotation of an ellipsoid;

said portion being projected from a remainder of said plane from said plane towards a prescribed camera viewpoint;

performing image pasting processing in which the original image is read and is pasted as a texture onto said 3-D model to form a composite image; and performing deformed image drawing processing including:

deforming the composite image in accordance with viewing the 3-D model with the original image pasted thereon from a prescribed camera viewpoint; and drawing said deformed composite image on a display screen.

11. A computer readable recording medium storing an executable 3-D image processing program, which intentionally distorts an original image to generate a deformed image on a display screen, said 3-D image processing program comprising the steps of:

storing an original image;

storing a 3-D model comprising a plurality of polygons defining a shape including a plane in which a portion of said plane is distorted in 3-D space by a curved surface protruding therefrom, wherein the plane is hounded by a rectangular outer perimeter, and the curved surface is defined by said plane cutting through a volume defined by a rotation of an ellipsoid;

performing image pasting processing, in which the original image is read and is pasted, as a texture, onto said 3-D model to form a composite image wherein the 3-D model is formed such that the composite image appears as a fisheye view of the original image in a portion corresponding to said at least a portion of said plane; and performing deformed image drawing processing including:

deforming the composite image in accordance with viewing the 3-D model with the original image pasted thereon from a prescribed camera viewpoint; and drawing said deformed composite image on a display screen.

* * * * *